E. H. BUCHMAN.
JOINT FOR BRACELET LINKS.
APPLICATION FILED FEB. 17, 1921.

1,410,366.

Patented Mar. 21, 1922.

Inventor
Edward H. Buchman,
By Attorney
Thos. S. Crane

UNITED STATES PATENT OFFICE.

EDWARD H. BUCHMAN, OF NEWARK, NEW JERSEY, ASSIGNOR TO BIPPART, GRISCOM & OSBORN, OF NEWARK, NEW JERSEY.

JOINT FOR BRACELET LINKS.

1,410,366.

Specification of Letters Patent. Patented Mar. 21, 1922.

Application filed February 17, 1921. Serial No. 445,861.

*To all whom it may concern:*

Be it known that I, EDWARD H. BUCHMAN, a citizen of the United States, residing at 52 Mapes Avenue, Newark, county of Essex, and State of New Jersey, have invented certain new and useful Improvements in Joints for Bracelet Links, fully described and represented in the following specification and the accompanying drawings, forming a part of the same.

The present invention relates to an improved construction for links of a bracelet, whereby each link is formed in one piece of hollow box-shape, the cross-bar at one end of which is narrowed and shaped to form a hinge-pin, and the opposite end is provided with a tongue to be wrapped around such pin and its end soldered to the body of the link.

A cover is soldered upon the top of each link, and clearance is formed between the hinge-pin and the cover to insert the end of the tongue when coupling the links together.

With this construction the cross-bar may be made of round or rectangular cross-section, the rectangular hinge-pin being preferable as having a stronger connection with the body of the link, and because it cannot rotate in its bearing, but limits the rocking of the links upon one another to the desired degree.

Figure 1:
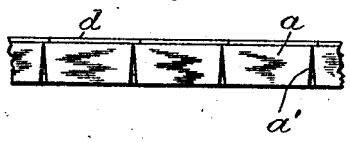
Figure 2:
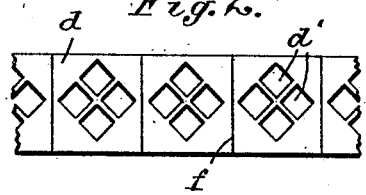
Figures 3, 4, 4A:
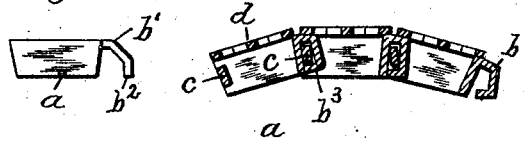
Figure 5:
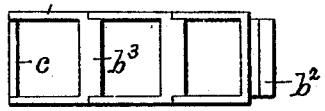
Figure 6:
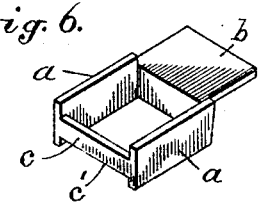
Figure 7:
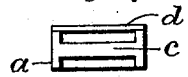

The construction will be understood by reference to the annexed drawing, in which Fig. 1 is a side view of several links in the finished bracelet; Fig. 2 is a plan of the same; Fig. 3 shows links coupled together on the rectangular hinge-pins; Fig. 4 is an edge view of a link with the tongue partially bent; Fig. 4ª shows the method of connecting the links for engaging them permanently together; Fig. 5 shows the under side of the links shown in Fig. 3; Fig. 6 is a perspective view of one of the links provided with the flat tongue and having the cross-bar narrowed; and Fig. 7 is a view of the link at the cross-bar end, with a cover-plate on the top-side of the link.

Fig. 6 shows the hollow box-like frame or body $a$ of the link, with the flat tongue $d$ at one end, and the cross-bar $c$ at the opposite end narrowed upon both of its edges $c'$ to form a rectangular hinge-pin.

A cover $d$ is secured by solder upon the upper side of each link, the covers fitting snugly together when the bracelet is straightened out, as shown at the close joint $f$ in Fig. 2, and thus covering the hinges of the links.

The ends of the side-plates of each link are beveled as shown at $a'$ in Fig. 1 to permit the flexure of the bracelet upon its hinge-pin, when placed on the arm.

If the flattened hinge-pins be used, links are connected to tip upon one another by bending the tongue $b$ at several points in its length to form a rectangular socket which embraces the rectangular hinge-pin with a pre-determined amount of clearance, which limits the bending of the bracelet when applied to the arm of the wearer.

The first bend of the tongue is shown in Fig. 4 making a lip $b^2$ across the end of the tongue, and an angular bend $b'$ between the lip and the adjacent edge of the link.

The lip as shown in Fig. 4ª can then be inserted in the space between the cover $d$ and the upper edge of the cross-bar $c$.

When the tongue is thus engaged with the edge of another link and turned in its normal position as shown in Fig. 3, the lip is bent at a right-angle to the tongue and crowded against the adjacent edge of the link, as shown at $b^3$ upon the two links in the left-hand of Fig. 3.

Fig. 3 shows in section three links with the middle one jointed to the others. The right-hand link has its tongue shown with a final bend $b^3$ which is made after the links are jointed together. The lip is finally closed against the adjacent end of the link, as shown upon the middle link in Fig. 3, and soldered thereto.

Such bending is indicated in Fig. 3, the downward tipping of the left-hand link bringing the upper corner of the hinge-pin against the upper corner of its socket and leaving the clearance at the lower corner of the hinge-pin.

The downward tipping of the right-hand link brings the lower corner of the socket in contact with the lower corner of the hinge-pin, leaving the clearance adjacent to the upper corner.

To give an ornamental appearance to the outer side of the bracelet, the cover-plate may be made of any preferred design, or may be made to support settings for jewels.

Flat cover-plates with four obliquely disposed apertures $d'$ are shown in Figs. 1 and 2 of the drawings, but all such ornamental features are independent of the mechanical elements which are claimed herein.

Having thus set forth the nature of the invention what is claimed herein is:

A bracelet comprising a connected series of similar links having flat sides with parallel edges, each consisting of a square frame with a tongue at one end and an integral cross-bar at the opposite end narrowed to form a hinge-pin, a cover-plate projected over the said hinge-pin with a space between the two, and the tongue having a lip at one end adapted to guide the tongue between the cover and the hinge-pin.

In testimony whereof I have hereunto set my hand.

EDWARD H. BUCHMAN.